(12) United States Patent
Song (10) Patent No.: US 11,857,067 B2
(45) Date of Patent: Jan. 2, 2024

(54) CONNECTING DEVICE HAVING RETRACTABLE RODS

(71) Applicant: JIANGXI RASSON BILLIARD MANUFACTURING CO., LTD, Jiujiang (CN)

(72) Inventor: Jin Song, Jiujiang (CN)

(73) Assignee: JIANGXI RASSON BILLIARD MANUFACTURING CO., LTD, Jiujiang (CN)

( * ) Notice: Subject to any disclaimer, the term of this patent is extended or adjusted under 35 U.S.C. 154(b) by 497 days.

(21) Appl. No.: 17/244,974

(22) Filed: Apr. 30, 2021

(65) Prior Publication Data

US 2022/0312950 A1 Oct. 6, 2022

(30) Foreign Application Priority Data

Mar. 31, 2021 (CN) .......................... 202110345521.0

(51) Int. Cl.
*A47B 3/00* (2006.01)
*A47C 4/00* (2006.01)
*F16B 12/40* (2006.01)

(52) U.S. Cl.
CPC ................ *A47B 3/002* (2013.01); *A47C 4/00* (2013.01); *F16B 12/40* (2013.01)

(58) Field of Classification Search
CPC ........... A47C 4/28; A47C 4/283; A47C 4/286; A47C 4/32; A47C 4/42; A47B 3/00; A47B 3/002; F16B 7/00; F16B 12/40; F16B 2012/403; F16B 2012/406; A63B 67/04

USPC .................. 403/63, 64, 169, 170, 174, 178; 297/16.1, 16.2, 45
See application file for complete search history.

(56) References Cited

U.S. PATENT DOCUMENTS

| 2,533,173 | A | * | 12/1950 | Mitchell | A47B 3/0818 108/130 |
| 5,531,493 | A | * | 7/1996 | Reynolds | A47D 13/105 292/160 |
| 5,865,479 | A | * | 2/1999 | Viney | E05C 9/041 70/DIG. 42 |
| 6,478,345 | B1 | * | 11/2002 | Viney | E05C 9/047 70/108 |
| 6,840,574 | B1 | * | 1/2005 | Wu | A47C 1/0265 297/188.14 |
| 7,490,562 | B2 | * | 2/2009 | Cornilleau | A63B 67/04 108/170 |
| 8,171,863 | B2 | * | 5/2012 | Nyenhuis | A47B 5/00 108/115 |

(Continued)

FOREIGN PATENT DOCUMENTS

KR 102216564 B1 * 2/2021

*Primary Examiner* — Jonathan P Masinick (57) ABSTRACT

A connecting device includes a case (1), a first rod (2), a second rod (3), and a third rod (4) that are connected to the case (1). Two first connecting members (5) connect the second rod (3) and the third rod (4) to the case (1). A second connecting member (6) connects the first rod (2) to the case (1). The case (1) includes an upper housing (101) and a lower housing (102) that define a first receiving hole (10), a second receiving hole (11), and a third receiving hole (9), the second connecting member (6) and the two first connecting members (5) are received in the first receiving hole (10), the second receiving hole (11), and the third receiving hole (9), respectively.

8 Claims, 8 Drawing Sheets

(56) References Cited

U.S. PATENT DOCUMENTS

| | | | | |
|---|---|---|---|---|
| 8,991,920 B2* | 3/2015 | Oren | ............... | A47D 13/101 |
| | | | | 297/16.2 |
| 9,609,945 B2* | 4/2017 | Krusin | ............ | A47B 3/0818 |
| 2004/0226491 A1* | 11/2004 | Chen | .............. | A47B 43/00 |
| | | | | 108/124 |
| 2008/0178778 A1* | 7/2008 | Koning | ............ | A47B 3/0818 |
| | | | | 108/132 |
| 2008/0196635 A1* | 8/2008 | Piretti | ............. | A47B 3/08 |
| | | | | 108/118 |
| 2011/0148155 A1* | 6/2011 | Chapman | ........... | A47D 9/053 |
| | | | | 5/120 |

* cited by examiner

CONNECTING DEVICE HAVING RETRACTABLE RODS

CROSS REFERENCE TO RELATED APPLICATIONS

This application claims priority to Chinese Patent Application No. 202110345521.0, filed Mar. 31, 2021, which is hereby incorporated by reference herein as if set forth in its entirety.

BACKGROUND

1. Technical Field

The present disclosure generally relates to connecting devices, and particularly to a connecting device having retractable rods.

2. Description of Related Art

Folding tables/chairs (e.g., folding table tennis table) include connecting devices to achieve foldability. Many connecting devices for folding tables/chairs are of complex structures, which are not convenient for installation and unfolding operations, and cannot achieve synchronous movement of the foldable components of the folding tables/chairs.

Therefore, there is a need to provide a connecting device to overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Referring to FIGS. 1-4, in one embodiment, a connecting device having retractable rods includes a case 1, a first rod 2, a second rod 3, and a third rod 4 that are connected to the case 1. The connecting device further includes two first connecting members 5 that is configured to connect the second rod 3 and the third rod 4 to the case 1, and a second connecting member 6 that is configured to connect the first rod 2 to the case 1. The case 1 may include an upper housing 101 and a lower housing 102. The upper housing 101 and the lower housing 102 define a first receiving hole 10, a second receiving hole 11, and a third receiving hole 9. The second connecting member 6 and the two first connecting members 5 are received in the first receiving hole 10, the second receiving hole 11, and the third receiving hole 9, respectively. The lower housing 102 includes two shafts 1022 that are located at opposite sides of the second connecting member 6, and two rotary tabs 7 that are movably connected to the two shafts 1022. The two rotary tabs 7 each include a first end that is movably connected to the second connecting member 6 and a second end, and the second ends of the two rotary tabs 7 are movably connected to the first connecting members 5 at opposite sides of the second connecting member 6, respectively. A spring 8 is arranged within the case 1 and arranged around the second connecting member 6.

Figure 1:
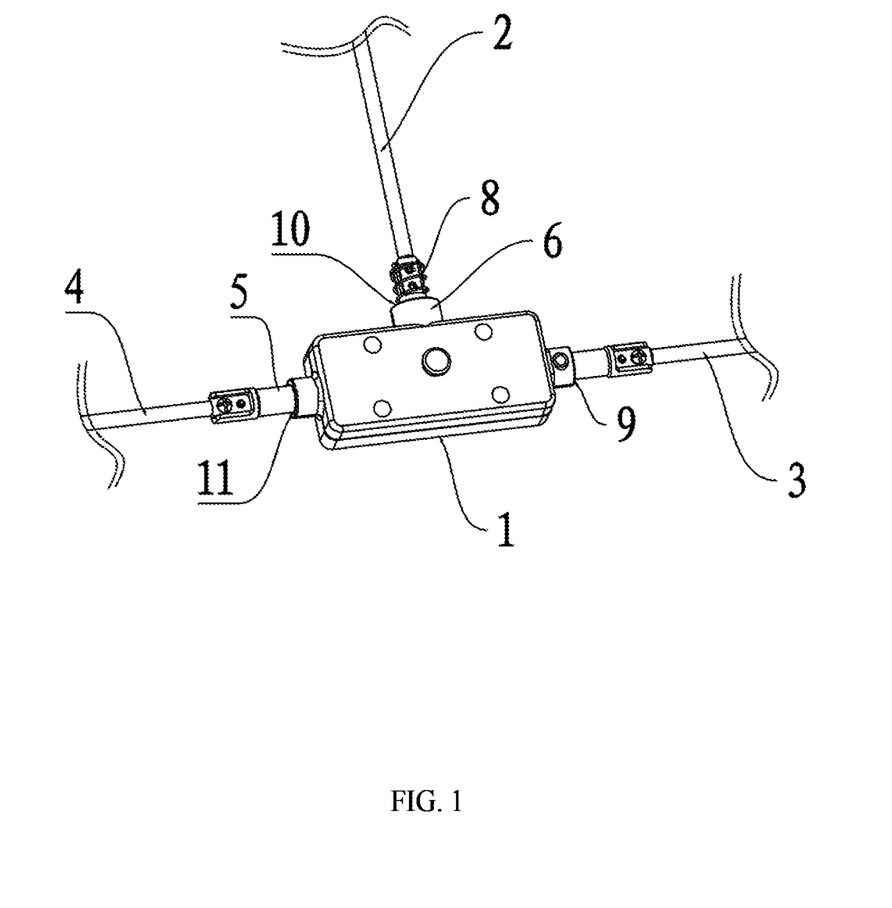
FIG. 1 is an isometric view of a connecting device according to one embodiment.
Figure 2:
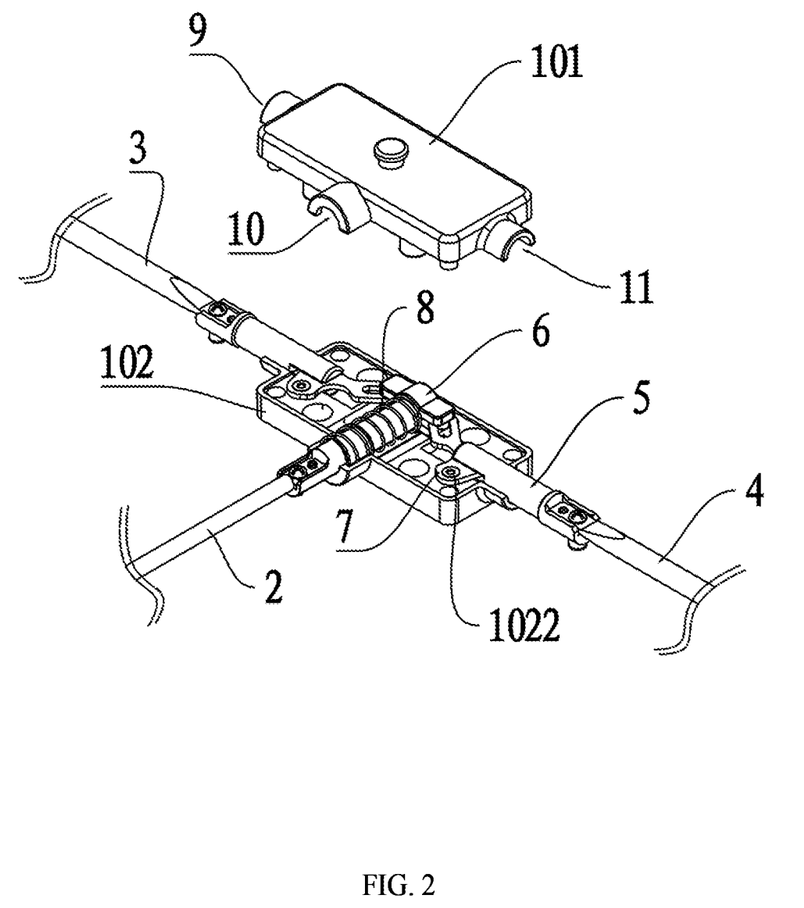
FIG. 2 is an isometric exploded view of the connecting device of FIG. 1.
Figure 3:
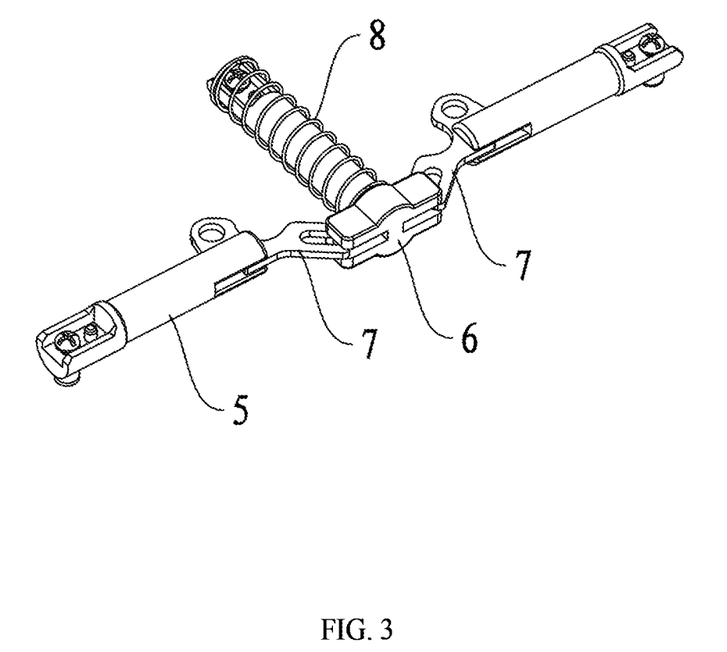
FIG. 3 is an isometric view of an assembly including two first connecting members, a first connecting member, and two rods.
Figure 4:
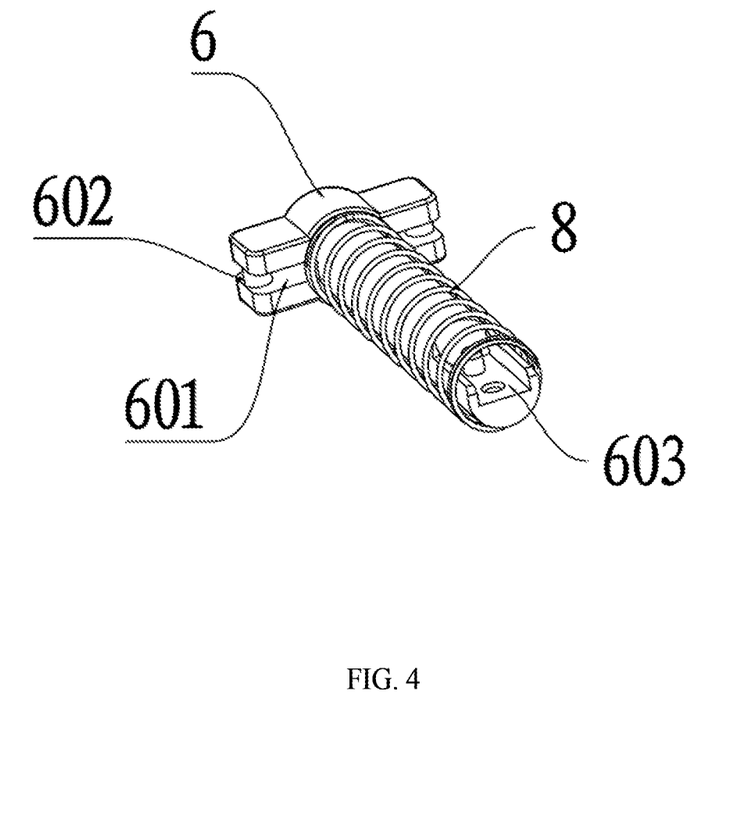
FIG. 4 is an isometric view of the second connecting member according to one embodiment.

In one embodiment, the second connecting member 6 is T-shaped and includes three ends. A first and a second of the three ends each define a slot 601, and includes a post 602 extending from an upper inner surface of the slot 601 to a lower inner surface of the slot 601. A third of the three ends defines a recess 603 to securely receive one end of the first rod 2.

Figure 5:
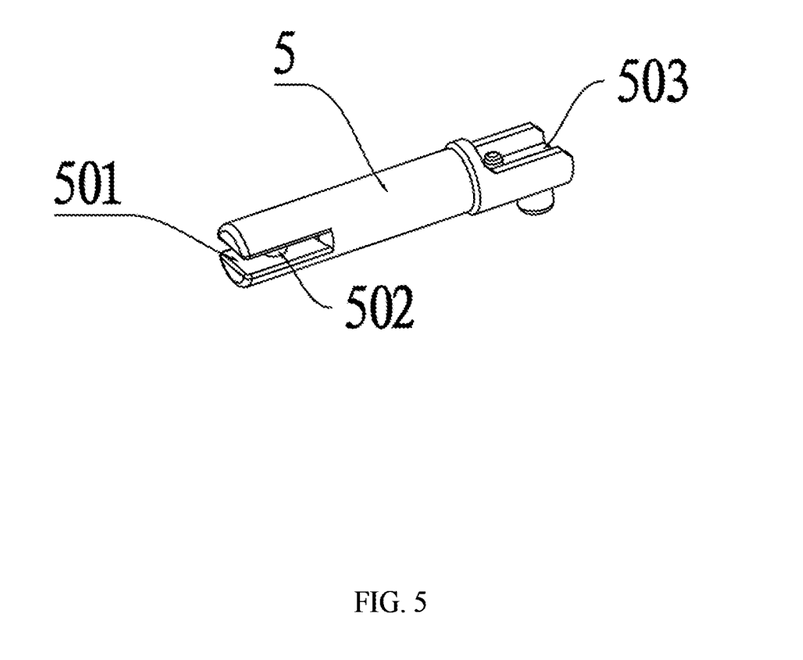
FIG. 5 is an isometric view of the first connecting member according to one embodiment.

Referring to FIG. 5, in one embodiment, a first end of each of the first connecting members 5 defines a slot 501 and includes a post 502 extending from an upper inner surface of the slot 501 to a lower inner surface of the slot 501. A second end of each of the first connecting members 5 defines a recess 503, and the recesses 503 are configured to securely receive ends of the second rod 3 and the third rod 4.

Figure 6:
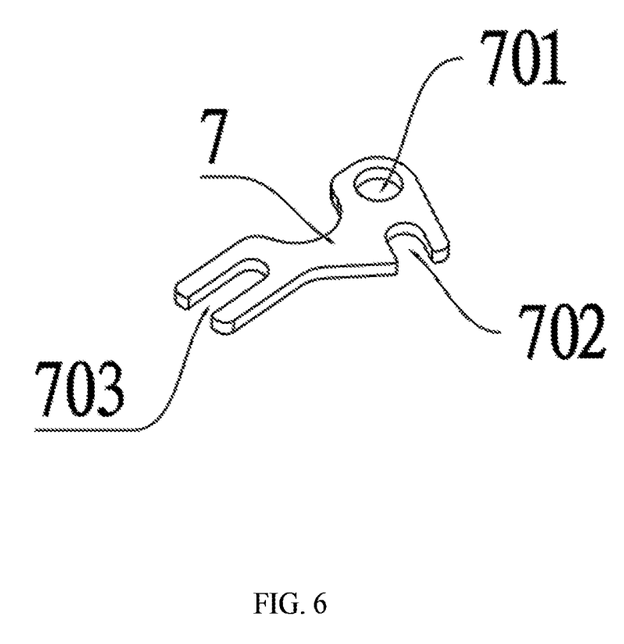
FIG. 6 is an isometric view of a rotary tab according to one embodiment.

Referring to FIG. 6, in one embodiment, each of the rotary tabs 7 defines a through hole 701, a first groove 702 and a second groove 703. The shafts 1022 pass through the through holes 701 to rotatably connect the rotary tabs 7 to the case 1. The posts 502 of the first connecting members 5 are movably received in the first grooves 702, which movably connect the rotary tabs 7 to the first connecting members 5. The posts 602 of the second connecting members 6 are movably received in the second grooves 703, which movably connect the rotary tabs 7 to the second connecting member 6.

Figure 7:
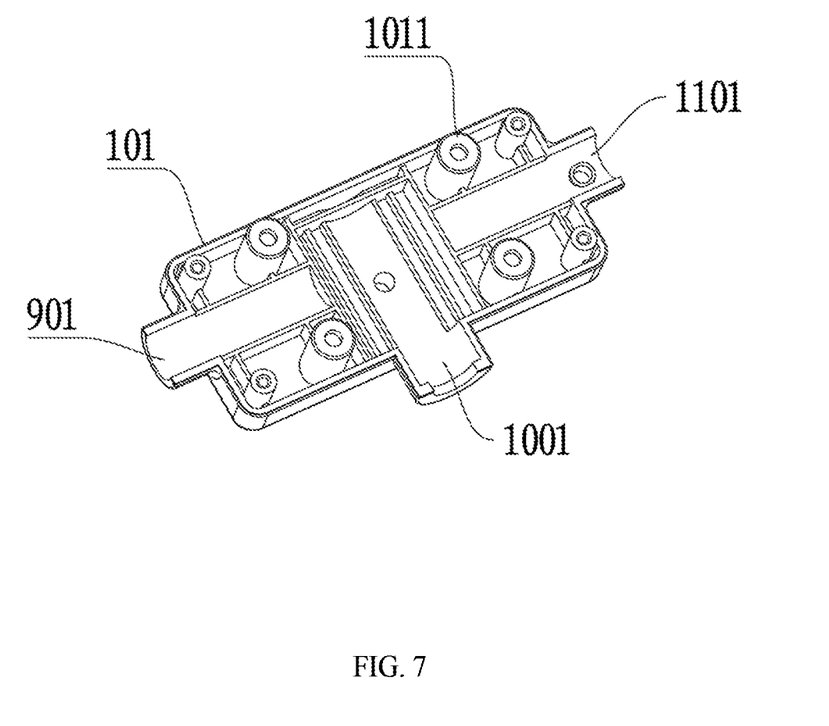
FIG. 7 is an isometric view of an upper housing according to one embodiment.
Figure 8:
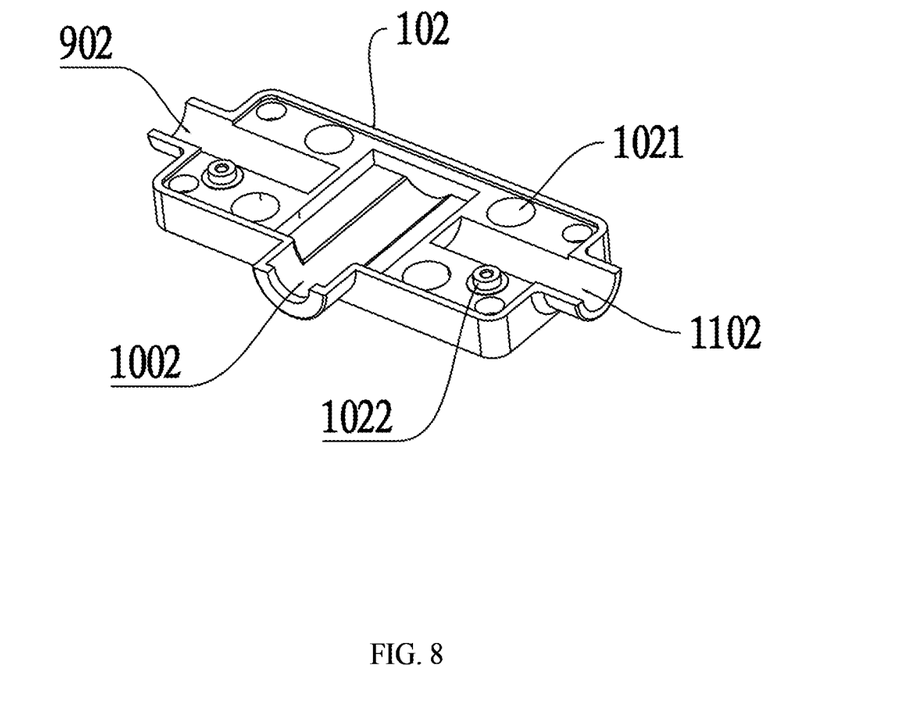
FIG. 8 is an isometric view of a lower housing according to one embodiment.

Referring to FIGS. 7 and 8, in one embodiment, the upper housing 101 includes a number of positioning posts 1011, and the lower housing 102 includes a number of positioning holes 1021 to respectively receive the positioning posts 1011.

In one embodiment, the first receiving hole 10 is formed by a first half hole 1001 defined in the upper housing 101 and a second half hole 1002 defined in the lower housing 102.

In one embodiment, the second receiving hole 11 is formed by a first half hole 1101 defined in the upper housing 101 and a second half hole 1102 defined in the lower housing 102.

In one embodiment, the second receiving hole 9 is formed by a first half hole 901 defined in the upper housing 101 and a second half hole 902 defined in the lower housing 102.

When in use, a user may pull the first rod 2 to cause the first rod 2 to pull the second connecting member 6. The second connecting member 6 then moves along the first receiving hole 10. Since the posts 602 are movably received in the second grooves 703 of the rotary tabs 7, linear movement of the second connecting member 6 causes the posts 602 to apply a pushing force to the rotary tabs 7. The rotary tabs 7 then starts to rotate about the shafts 1022. Since the posts 502 of the first connecting members 5 are movably received in the first grooves 702, rotation of the rotary tabs 7 causes one inner side of each first groove 702 to apply a pushing force to a corresponding first connecting member 5. The first connecting members 5 then moves along the second receiving hole 11 and the third receiving hole 9, which pulls the second rod 3 and the third rod 4 to move linearly toward each other. That is, a portion of each of the second rod 3 and the third rod 4 moves into the case 1. The second rod 3 and the third rod 4 then disengage from corresponding counterpart components of a folding table/chair, which allows foldable components of the folding table/chair to be folded.

When the folding table/chair needs to be unfolded, a user may pull the first rod 2 and the foldable components of the folding table/chair are moved to a desired position. The user can then release the first rod 2. The compressed spring 8 then rebounds and pushes the second connecting member 6 to move. Linear movement of the second connecting member 6 causes the posts 602 to apply a pushing force to the rotary tabs 7. The rotary tabs 7 then starts to rotate about the shafts 1022. Rotation of the rotary tabs 7 causes one inner side of each first groove 702 to apply a pushing force to a corresponding first connecting member 5. The first connecting members 5 then moves along the second receiving hole 11 and the third receiving hole 9, which pushes the second rod 3 and the third rod 4 to move linearly away from each other. That is, a portion of each of the second rod 3 and the third rod 4 moves out of the case 1. The second rod 3 and the third rod 4 come into engagement with the corresponding counterpart components of a folding table/chair, which holds the folding table/chair in the unfolded state.

In one embodiment, the rotary tabs 7 are symmetric to each other with respect to the second connecting member 6, which allow for synchronous movement of the second rod 3 and the third rod 4, ensuring synchronous movement of the foldable components of the folding table/chair.

The connecting device according to embodiments described above has the advantage of simple structure, convenient installation and operation, and low cost.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A connecting device comprising:
   a case (1);
   a first rod (2), a second rod (3), and a third rod (4) that are connected to the case (1);
   two first connecting members (5) configured to connect the second rod (3) and the third rod (4) to the case (1);
   a second connecting member (6) configured to connect the first rod (2) to the case (1); and
   a spring (8) arranged within the case (1) and arranged around the second connecting member (6);
   wherein the case (1) comprises an upper housing (101) and a lower housing (102), the upper housing (101) and the lower housing (102) define a first receiving hole (10), a second receiving hole (11), and a third receiving hole (9), the second connecting member (6) and the two first connecting members (5) are received in the first receiving hole (10), the second receiving hole (11), and the third receiving hole (9), respectively, the lower housing (102) comprises two shafts (1022) that are located at opposite sides of the second connecting member (6), and two rotary tabs (7) that are movably connected to the two shafts (1022), the two rotary tabs (7) each comprise a first end that is movably connected to the second connecting member (6) and a second end, and the second ends are movably connected to the first connecting members (5), respectively.

2. The connecting device of claim 1, wherein the second connecting member (6) is T-shaped and comprises three ends, a first and a second of the three ends each define a slot (601), and comprises a post (602) in the slot (601), and a third of the three ends defines a recess (603) to securely receive one end of the first rod (2).

3. The connecting device of claim 2, wherein a first end of each of the first connecting members (5) defines a slot (501) and comprises a post (502) in the slot (501), and a second end of each of the first connecting members (5) defines a recess (503), the recesses (503) are configured to securely receive ends of the second rod (3) and the third rod (4).

4. The connecting device of claim 3, wherein each of the rotary tabs (7) defines a through hole (701), a first groove (702) and a second groove (703), the shafts (1022) pass through the through holes (701) to rotatably connect the rotary tabs (7) to the case (1), the posts (502) of the first connecting members (5) are movably received in the first grooves (702), which movably connect the rotary tabs (7) to the first connecting members (5), and the posts (602) of the second connecting members (6) are movably received in the second grooves (703), which movably connect the rotary tabs (7) to the second connecting member (6).

5. The connecting device of claim 1, wherein the upper housing (101) comprises a plurality of positioning posts (1011), and the lower housing (102) comprises a plurality of positioning holes (1021) to respectively receive the positioning posts (1011).

6. The connecting device of claim 1, wherein the first receiving hole (10) is formed by a first half hole (1001) defined in the upper housing (101) and a second half hole (1002) defined in the lower housing (102).

7. The connecting device of claim 1, wherein the second receiving hole (11) is formed by a first half hole (1101) defined in the upper housing (101) and a second half hole (1102) defined in the lower housing (102).

8. The connecting device of claim 1, wherein the second receiving hole (9) is formed by a first half hole (901) defined in the upper housing (101) and a second half hole (902) defined in the lower housing (102).

\* \* \* \* \*